(12) United States Patent
Ellis et al.

(10) Patent No.: US 7,101,420 B1
(45) Date of Patent: Sep. 5, 2006

(54) SELF CLEANING AIR FILTRATION MACHINE AND A METHOD FOR USING THE SAME

(76) Inventors: Adria Valley Anne Nelson Ellis, 102 Dogwood Dr., Tellico Plains, TN (US) 37385; Rob Nelson, 102 Dogwood Dr., Tellico Plains, TN (US) 37385

( * ) Notice: Subject to any disclaimer, the term of this patent is extended or adjusted under 35 U.S.C. 154(b) by 20 days.

(21) Appl. No.: 10/784,360
(22) Filed: Feb. 23, 2004
(51) Int. Cl.
  *B01D 47/00* (2006.01)
  *B01D 46/20* (2006.01)
  *B01D 46/22* (2006.01)
  *B01D 47/06* (2006.01)
(52) U.S. Cl. ............... 95/281; 95/8; 95/25; 95/29; 95/187; 95/213; 95/215; 95/237; 95/277; 95/285; 96/223; 96/224; 96/227; 96/230; 96/231; 96/233; 96/234; 96/235; 96/245; 96/268; 96/269; 96/270; 96/280; 96/283; 96/288; 96/289; 96/389; 96/417; 96/418; 96/419; 96/424; 55/351; 55/354; 55/400; 55/422; 55/482; 55/524
(58) Field of Classification Search .......... 96/223, 96/224, 226–228, 230, 231, 233–235, 244, 96/245, 265, 267–270, 274, 276–278, 280–284, 96/286–289, 389, 397, 399, 417–419, 424; 95/1, 8, 12, 24, 25, 29, 154, 187, 210–215, 95/230, 237, 273, 277, 278, 281, 285; 55/385.1, 55/351, 354, 400–403, 410, 410.1, 413, 418, 55/418.1, 422, 482, 524; 454/237, 254–256, 454/339
See application file for complete search history.

(56) References Cited

U.S. PATENT DOCUMENTS

| | | | | | |
|---|---|---|---|---|---|
| 2,703,228 | A | * | 3/1955 | Fleisher | 96/235 |
| 2,815,826 | A | * | 12/1957 | Young | 95/277 |
| 3,659,402 | A | * | 5/1972 | Alliger | 55/524 |
| 3,710,548 | A | * | 1/1973 | Coughlin | 96/231 |
| 3,928,008 | A | * | 12/1975 | Petersen | 55/472 |
| 4,135,894 | A | * | 1/1979 | Himes et al. | 95/215 |
| 4,358,204 | A | * | 11/1982 | Ellner | 366/118 |
| 5,902,383 | A | * | 5/1999 | Hirose | 96/231 |
| 6,063,170 | A | * | 5/2000 | Deibert | 96/224 |
| 6,162,286 | A | * | 12/2000 | Hasama et al. | 96/231 |
| 6,293,861 | B1 | * | 9/2001 | Berry | 454/255 |
| 6,419,821 | B1 | * | 7/2002 | Gadgil et al. | 210/86 |
| 2004/0079234 | A1 | * | 4/2004 | Gorbulsky | 96/289 |

* cited by examiner

Primary Examiner—Jason M. Greene

(57) ABSTRACT

Self cleaning air filtration machine and a method for using same comprising; a filter with a motor driven belt or disk or counter rotating disks that are perforated, a spray bar, a recirculation pump and supply line, a wet tank, a ultrasonic transducer, ultraviolet submersible bulbs, a water fill port, a liquid level sensor, a liquid and sediment drain port, and a power source. A preferred embodiment includes a subsonic transducer on the wet tank. A preferred embodiment includes a air diffuser, a toxic and noxious gas detection and recognition and radiation detection with automatic safety shut down and audible and visual alarm, a ultraviolet saturation chamber. A preferred embodiment includes a secondary wet filter, a secondary air diffuser, a secondary ultraviolet saturation chamber. A preferred embodiment includes a inline dryer assembly.

12 Claims, 4 Drawing Sheets

SELF CLEANING AIR FILTRATION MACHINE AND A METHOD FOR USING THE SAME

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of treating air and more specifically to self cleaning air filtration machine and a method for using same.

The invention relates generally to the field of treating air and more specifically to a machine for air filtration that is self cleaning and a method for filtering air with same as well as multiple steps for entrapment and neutralization of bacteria germs and particulate for detection and recognition of toxic and noxious gases and radiation detection with automatic safety shut down which will cause a safety charcoal filter to drop into place and will trigger an audible and visual alarm.

Prior to 911 I had developed a system of filtering air for use in the heating ventilation air conditioning discipline using knowledge acquired in the field of practical design and application. It became apparent that there is no system or process of systems available in field application or patents granted, for the self contained removal and disposal of health threatening disease. Subsequent to the horrific 911 incident it became clear that steps to design a system and a method using that system to either front end a existing heating ventilation air conditioning system or a total stand alone system or part of a new heating ventilation conditioning system installation. I believe this process is the solution to the removal of all life threatening forms of airborne diseases known at the time of this writing and application.

In our search for air handling systems that would have the capability to cover a variety of individuals unique needs, as well as the practicability to operate in a very full household. What we found was a multitude of variations of hepa, of which are allergen, micro, with activated charcoal, with electrostatic charge. Then there seems to be a sub category, hepa prefilters containing one of the following carbon or zeolite and potassium permanganate. Both the hepa and the hepa prefilters are used to remove varying sizes of particulate from the air being drawn through the filter. The claims vary depending on the specific filter or combination of filters. The claims are for removal of pollen, dust, lint, pet dander, mold, bacteria, smoke, and smog particles, some even claim to catch particles that can carry viruses.

Our search did not end with hepa's, we also checked into activated charcoal filters, filter with carbon or drum, which basically is a round filter again with carbon. The primary function we found is to absorb gaseous pollutants, especially volatile organic compounds, odors and large particulate.

Also we found the use of ultraviolet lights in air handling systems. Placement varies but was mostly near where water or moisture may collect. The objective is to break down almost all organic contaminants such as bacteria, micro viral organisms, mold, infectous diseases. The ultraviolet lights also have the added side affect, emitting negative ions, which freshen the air and can make people feel uplifted and lively. Although it is not used very much we did find an air filtration unit with dryer assembly which was used to decrease humidity in the air stream.

With gas detection and recognition systems (Berry) being fairly new technology for the public, we did not find any air filtration systems on the market with the gas detection and recognition option, athe same with the radiation detection (Berry) which is readily avaliable for the nuclear industry, but not available to the public at large as of yet. A recirculation pump circulates liquid through a given system and is used in many different mediums.

Ultrasonic transducer, is used to agitate liquid with the usre of sound waves at frequency of 20 kilohertz or higher. The ultrasonic transducer is able to induce particulate release from surfaces in liquid. Subsonic transducer, agitates with sound using low frequency for particulate suspension.

Audible and visual alarms are widely avaliable and found in a large variety of products (Berry). As well as air diffusers which are used to prevent laminar air flow, these are widely avaliable and in innumerable configurations. Automatic safety shut off will shut down an operating system in case of a harmful situation, yet again a system that is used in innumerable products (Berry).

We located in our search for an air filtration system many four and five step systems. These systems combine usage of four or five of the following: ultrviolet, hepa, carbon drum, carbon post filter, filter with carbon, prefilter, ionizer, collector plates, activated charcoal, negative ion, and ozonation. Each multiple step system was designed to satisfy the multiple causes of pollution in specific work and home environments to offer better air quality.

There seem to be several areas were the currently avaliable air filter systems could use improvement. The multiple step units are almost exclusively stand alone and do not have an option to be installed into a current or new air handling system. As well as the exdorbant cost of replacement filters, which many said units have more than one some as many as three. The added inconvienance of different schedules for filter changes, varying from one month to four years time span. With the systems containing the two or three filters with different clean or change schedules, the question is if the schedule is not adhered to precisely are they still effective?

All systems lack an ease of maintenance. Hasama has a belt filter with cleaning tank the filter is metal, this is not a practical application for everyday use for odvious reasons rust, corrosion, pitting from cleaning solutions, lack of flexibility. Coughlin, Young and Hasama have belted filtration methods Young employs the use of a metal filter matrix that gets coated with fibers. The fibers are the filter medium which then get washed off and returned to the tank with the contaminates the presumption is that the fibers and contaminates will seperate, with the contaminates settling to the bottom of the tank. Although the tank has an impellor in the tank to keep the fibers from settling this is not realistic. Coughlins belted filter uses water as means to clean impure gases from the air this system has a spray bar and a tank the tank is used as a return for the spray. This system is dependent on someone to change the water, and the water removing all impurities in the air. Hasama's belt filter is used for removal of exhaust directly related to cooking, as such the system is used to remove oils and grease contained in the air. This system is more efficient and easier to clean than current systems but is not clear on removal of cleaning liquid or build up of contaminates in cleaning liquid the transducer aids in releasing the contaminants from the filter. How long till saturation of liquid?

Fleisher's air filtration machine contains multiple discs stacked and motor driven, a wash tank, a drain port, a water fill port and liquid level float. This system has some very serious problems, settling of sediment making it difficult to maintain or drain, the drain at the bottom could easily become clogged with settled sediment. Contamination of disks from wash tank due to lack of disinfection medium. And because Fleisher choose metal as the filter medium we again have the problem of rust and corrosion.

Hasama, Himes, Fleisher, Alliger and Hirose all have a variation of wet filters these filters are incomplete they do not contain all needed elements. Hasama and Fleisher are restricted by the material choosen for the filter, the choosen medium is metal when working with liquid this can create problems such as rust, corrosion, pitting from cleaning solutions and limited porosity. In Hirose, Alliger and Himes case, Himes and Alliger's filter has a wash that runs through and to the other side. Neither are clear where the dirty or contaminated wash is supposed to go. The choosen medium is not the issue with Himes, the problem here is particulate. This is a filter for gas and will not function if the particulate will not wash through the filter. Hirose's filter is designed to remove noxious material and dust, and is also lacking although the filter is dipped into a tank there is no element to aid in the release of the particulate that has impinged onto the filter surface. This again will eventually cause the filter to clog and become ineffiecent.

Ellner, Diebert and Gadgil all implement ultraviolet bulbs Gadgil and Ellner use them in a liquid Gadgil's use is for water disinfection, drinking water, in use with ceramic filters and are not located in the water. Ellner applies the ultraviolet lights with the ultrasonic transducer as a cleaning apparatus the transducer is used to keep the ultraviolet lights free of debris so they will maintain efficiency. This is not a air or water filter it is used strictly to keep the ultraviolets at optimum. Diebert uses a four step process to filter air, specifically we would like to compare the use of an ultraviolet chamber to remove bacteria from the air flow. This is good in theory, but due to laminar air flow and rate of air flow this ultraviolet chamber is not used effectively.

Alliger has a treated surface, the screen is metal, the coating is to prevent corrosion and does nothing to increase particulate impingement on the screen. Petersen involves the use of a air diffuser, placement is of utmost importance. Petersen's air diffuser is in front of his filter we feel that our placement after the filter is in this situation the best place for the diffuser.

Said systems are targeted at very specific problems such as allergies, odors, gases or particulate. These systems function very well in that arena but are competely lacking in all other areas. Most air filter systems do not offer the option to decrease humidity levels or automatic safety shut down, none of the systems offer both no system offers toxic and noxious gas and radiation detection and recognition with automatic safety shut down and a audible and visual alarm. We are offering all of this in our process as well as a system that will self clean and dispose of any particulate, bacteria or germs without the need to be handled.

BRIEF SUMMARY OF THE INVENTION

The primary object of the invention is to provide a system with optimal efficiency and minimal maintenance.

Another object of the invention is to provide a system that will entrap any and all airborne particulate that is in fresh or recirculate air.

Another object of the invention is to provide a system that will extract bacteria germs and particulate and neutralize and dispose of such without the need to be handled.

A further object of the invention is to provide a system that is a composite of individual systems.

Yet another object of the invention is to provide a self contained system for removal and disposal of health threatening airborne diseases.

Still yet another object of the invention is to provide a method of strategic placement of various options to optimize bacterial germ and particulate extraction.

Another object of the invention is to provide a method that will neutralize airborne particulate bacteria and germs.

Another object of the invention is to provide a system that detects toxic noxious gases and radiation with automatic safety shut down of the entire air handling system.

A further object of the invention is to provide a method that when safety shut down occurs a safety mechanism drops a charcoal filter into place to absorb and help prevent further circulation of any harmful gases.

Yet another object of the invention is to provide a audible and visual alarm in instances where shut down occurs.

Still yet another object of the invention is to provide a process that will identify gases including nerve agents.

Another object of the invention is to provide a process with optional humidity control.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a self cleaning air filtration machine and a method for using same comprising: a filter comprising a motor driven belt or disk or counter rotating disks that are perforated, a spray bar, a recirculation pump and supply line, a wet tank, a ultra sonic transducer, ultra violet submersible bulbs, a water fill port, a liquid level sensor, a liquid and sediment drain port, and a power source preferred embodiment may also include a subsonic transducer on the wet tank and or a chemical injection port on the wet tank preferred embodiment may also include a treated surface on the belt, disk or disks to aid in impingment of particulate.

In accordance with preferred embodiment of the invention, there is disclosed a process for self cleaning air filtration machine and a method for using the same comprising the steps of: passing an airstream to be filtered through a machine for air filtration comprising a filter comprising a motor driven belt or disk or counter rotating disks that are perforated, a spray bar, a recirculation pump and supply line, a wet tank, a ultra sonic transducer, ultra violet submersible bulbs, a water fill port, a liquid level sensor, a liquid and sediment drain port, and a power source, a air diffuser, a toxic and noxious gas detection and recognition and radiation detection, a automatic safety shut off with safety charcoal filter, a visual and audible alarm and a ultraviolet saturation chamber preferred embodiment may also include a inline dryer assembly preferred embodiment may also include a secondary wet filter, a secondary air diffuser, and a secondary ultraviolet saturation chamber for larger air handling systems.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a cross sectional view of the multiple counter rotating wet bacteria, germ and particulate extraction disk air filtering invention.

FIG. 2 is a cross sectional view of the belted wet bacteria, germ and particulate extraction air filtering invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
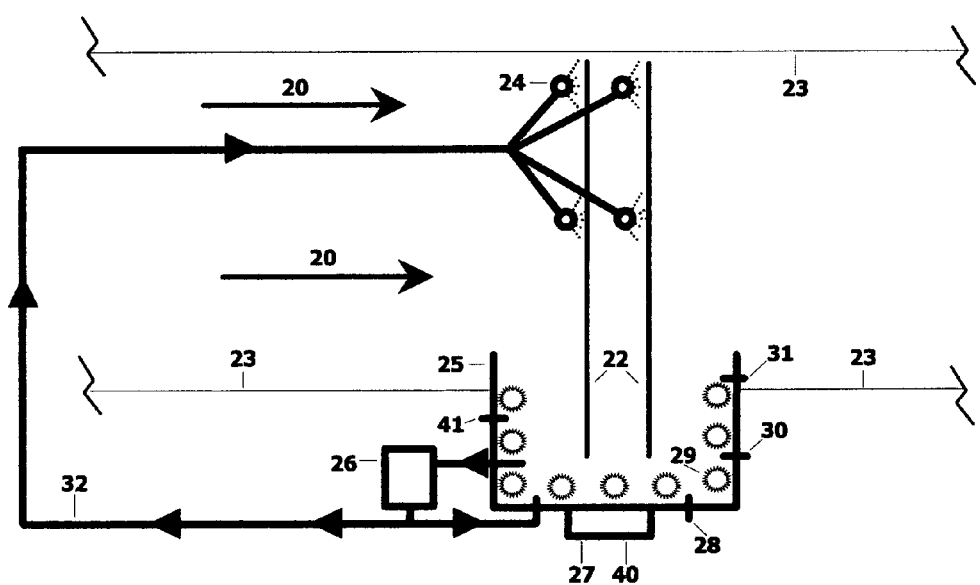

Upon inspection of FIG. 1 it will be seen that although this machine is an air filter that is where all similarities end. Attention is drawn to the fact that this is a wet filter that consists of counter rotating disks that are driven by a motor, powered by an outside source or a air driven generator and therefore are not stationary the said filter will also contain perforation. To enable long term use without the possibility of said filter becoming clogged there are spray bars that are provided with liquid from the wet tank by the recirculation pump, the direct results are first it wets the filter to aid in better particulate retention and second due to the continual spray the wet tank can function in a most efficient manner particulate does not get a chance to dry on the filter the wet tank can easily wash off particulate on the filter. The wet tank will include ultraviolet submersible bulbs which will neutralize anything that may be harmful in the wet tank and a ultrasonic transducer aids release of particulate from filter. Also included in the wet tank will be a liquid and sediment drain port a liquid level sensor that will insure optimum levels of liquid at all times with the aid of the water fill port which can add additional liquids using condensate from the evaporator or potable make up water. The wet tank may also include as an option a subsonic transducer to keep particulate in suspension and or a chemical injection port. The function of the wet tank is to wash the filter keeping it clean and functioning at optimum efficiency. A further option would be the surface of the filter may be treated.

Turning now to FIG. 1 there is shown two counter rotating motor driven perforated filtering disks 22 located on the interior of the air plenum 23 multiple spray bars 24 for each disk 22 a wet tank 25 can be filled using condensate from the evaporator or potable make up water or both through the water fill port 30 wet tank 25 provides wet spray to the spray bars 24 using recirculation pump 26 and supply line 32 wet tank 25 will have a ultrasonic transducer 27 and liquid and sediment drain port 28 in the wet tank 25 ultraviolet submersible bulbs 29 wet tank 25 will also have a liquid level sensor 31 optionally wet tank 25 may also include a subsonic transducer 40 and or a chemical injection port 41 arrows 20 show direction of air flow through disks 22 and air plenum 23.

Figure 2:
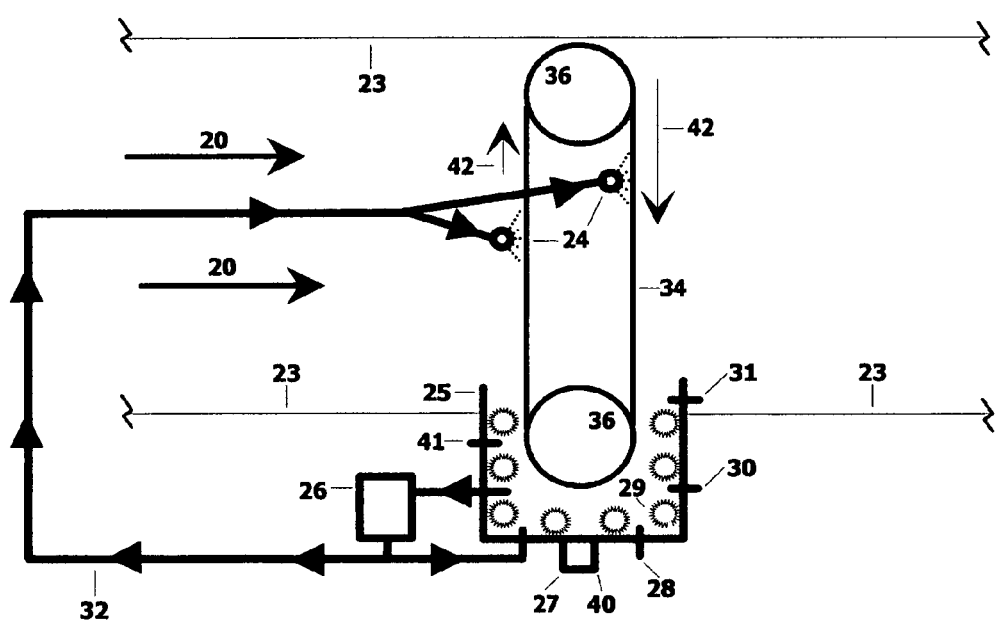

In like manner FIG. 2 is a machine for filtering air, it is to be noted that FIG. 2 is a perforated wet filter belt 34 on rollers 36 that is driven by a motor to rotate in the direction of arrow 42 the surface of the filter will be sprayed with liquid from the spray bars 24 which will be supplied from the wet tank 25 with the recirculation pump 26 through the supply line 32 the wet tank 25 will wash the filter 34 and will include a liquid fill port 30 that can be used with the liquid level sensor 31 to keep the wet tank 25 at optimum level using condensate from the evaporator and or potable make up water the wet tank 25 will have a ultrasonic transducer 27 to keep particulate in suspension and ultraviolet submersible bulbs 29 to neutralize anything that may be harmful in the wet tank 25 there will be a liquid and sediment drain port 28 on the wet tank 25 options are subsonic transducer 40 chemical injection port 41 and surface of the filter can be treaeted any or all options may be implemented arrow 20 shows direction of air flow thru filter 34 and air plenum 23.

Figure 3:
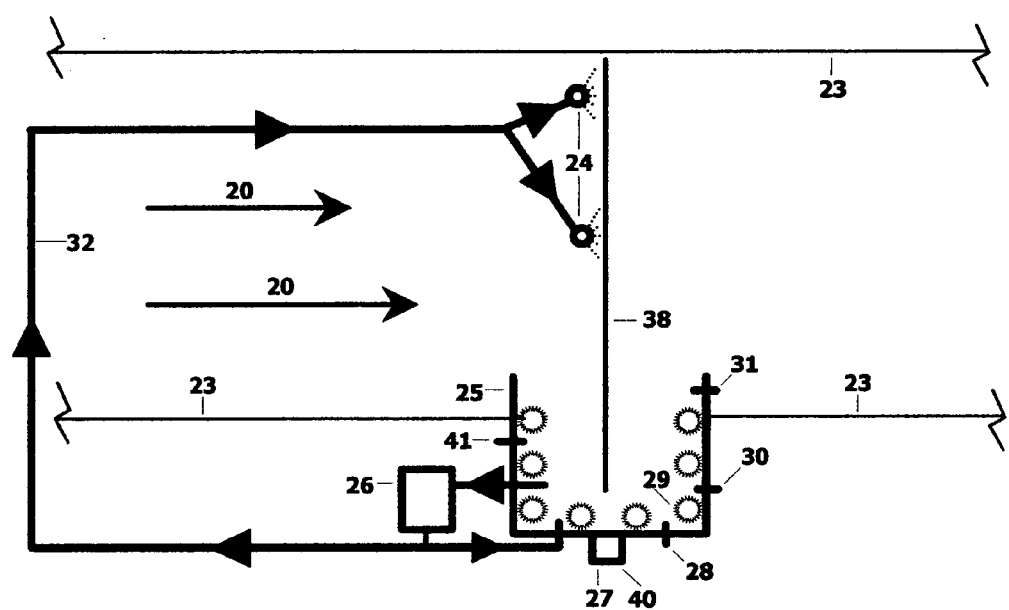
FIG. 3 is a cross sectional view of the single wet bacteria, germ and particulate extraction disk air filtering invention.

Similarly FIG. 3 is a machine for filtering air although this is different in every aspect to avaliable air filters. Attention is drawn to the fact that FIG. 3 is a single perforated filter disk 38 that is driven by a motor, the surface of the filter will be sprayed with liquid from the spray bars 24 which will be supplied from the wet tank 25 by the recirculation pump 26 through the supply line 32 the wet tank 25 will wash the filter 38 and will include a ultrasonic transducer 27 a liquid and sediment drain port 28 ultrviolet submersible bulbs 29 to neutralize anything in the wet tank 25 also included will be a liquid level sensor 31 that will keep the wet tank 25 at optimum levels using condensate from the evaporator and or potable make up water thru the liquid fill port 30 options that may be added are surface may be treated the wet tank 25 may also include a subsonic transducer 40 and or chemical injection port 41 any or all options may be implemented, arrows 20 show direction of air flow thru filter 38 and air plenum 23.

Thus it is seen that while the filter configuration may differ in FIGS. 1, 2 and 3 this is a machine that filters air using a wet filter that is self cleaning.

Figure 4:
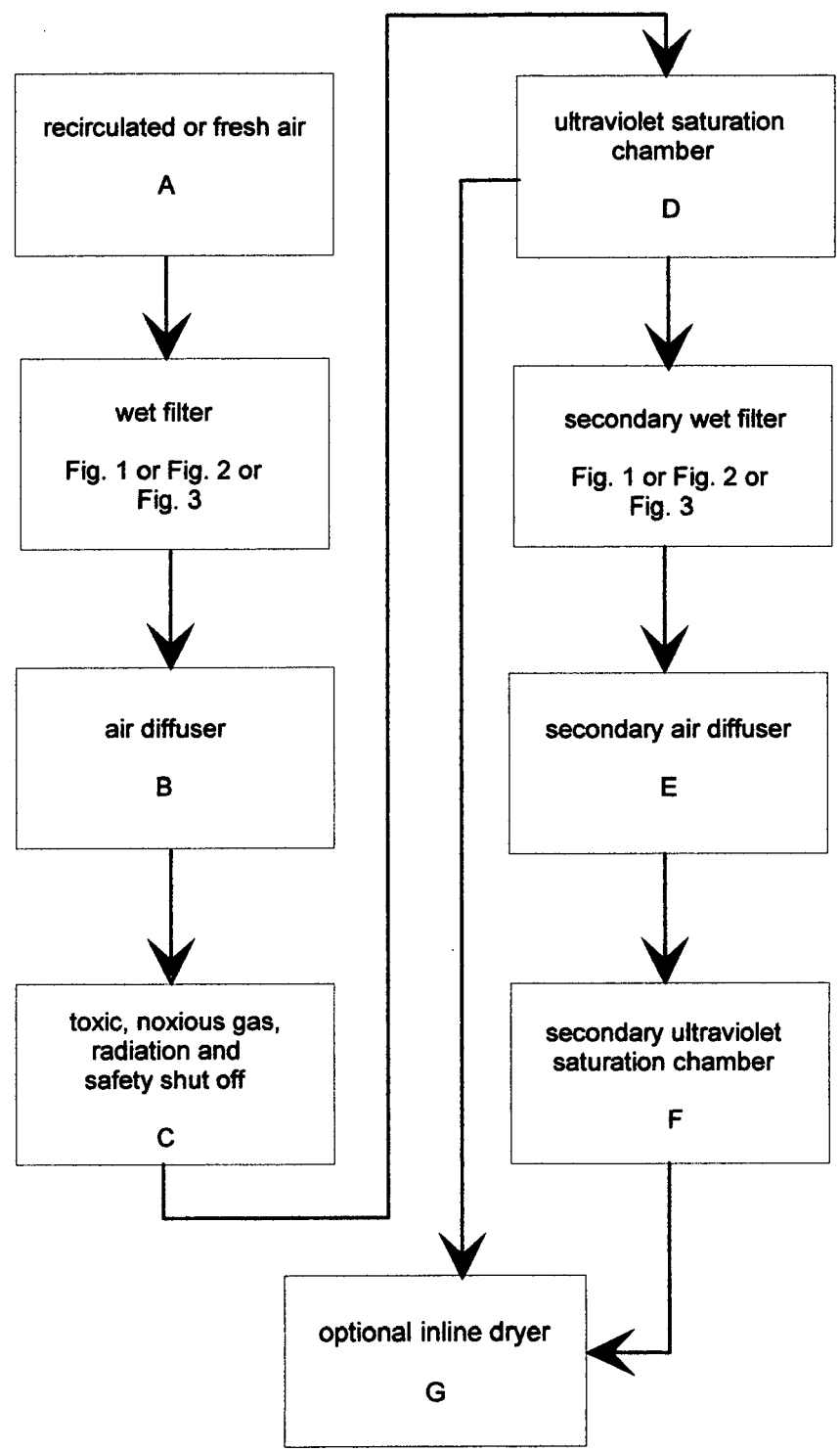
FIG. 4 is a flow chart of the operations that comprise the method of bacteria, particulate and germ extraction and neutralization as well as toxic and noxious gas detection and recognition and radiation detection with a automatic safety shut off with safety charcoal filter and audible as well as visual alarm for all heating ventilation air conditioning as well as air circulation systems.

Having observed the details of the air filter attention may now be given to the process as shown in FIG. 4 which is a flow chart comprising a complete and thorough self cleaning multiple step process for entrapment and neutralization of bacteria, germs and particulate, detection and recognition of toxic and noxious gases and radiation detection with automatic safety shut down, with safety charcoal filter.

The process is as follows recirculated or fresh air intake A through the wet filter as claimed in FIGS. 1, 2 and 3 one of which will be used, and passes through the air diffuser B which prevents laminar air flow air will then flow through toxic and noxious gas detection and recognition and radiation detection system which will include a automatic safety shut off in case of detection which would prompt a charcoal filter to be dropped into place to enable containment until situation can be fully dealt with this system would allow prompt recognition of element that caused shut down as well as trigger an audible and visual alarm C this will be followed by a ultraviolet saturation chamber D to neutralize any airborne contaminants that may be in the air.

For large air handling systems a secondary wet filter as claimed in FIGS. 1, 2 and 3 one of which will be used followed by a secondary air diffuser E and a secondary ultraviolet saturation chamber F to ensure a complete and thorough air treatment and optionally a process for making same further comprising an inline dryer assembly G for controlling excessive humidity levels this process offers the added benefit of placement of FIGS. 1, 2 and 3 as well as A through G for method may be structured as need calls to allow for all feasible configurations.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A self cleaning air filtration machine comprising:
   a filter comprising a motor driven belt or disk or counter rotating disks that are perforated;
   a spray bar;
   a recirculation pump and supply line;
   a wet tank;
   a ultra sonic transducer;
   ultra violet submersible bulbs;
   a water fill port;
   a liquid level sensor;
   a liquid and sediment drain port; and
   a power source.

2. A self cleaning air filtration machine as claimed in claim 1 further comprising a subsonic transducer on said wet tank.

3. A self cleaning air filtration machine as claimed in claim 1 further comprising a treated surface on said belt, disk or disks.

4. A self cleaning air filtration machine as claimed in claim 1 further comprising a chemical injection port on said wet tank.

5. A process for air filtration comprising the steps of:
   passing an airstream to be filtered through a self cleaning machine for air filtration comprising;
   a filter comprising a motor driven belt or disk or counter rotating disks that are perforated;
   a spray bar;
   a recirculation pump and supply line;
   a wet tank;
   a ultra sonic transducer;
   ultra violet submersible bulbs;
   a water fill port;
   a liquid level sensor;
   a liquid and sediment drain port;
   a power source;
   a air diffuser;
   a toxic and noxious gas detection and recognition and radiation detection device;
   a automatic safety shut down device with safety charcoal filter;
   a audible and visual alarm; and
   a ultraviolet saturation chamber.

6. A process for air filtration as claimed in claim 5 wherein the process for air filtration further comprises the steps of:
   passing an airstream to be filtered through a self cleaning machine for air filtration comprising,
   a secondary wet filter,
   a secondary air diffuser,
   a secondary ultraviolet saturation chamber.

7. A process for air filtration that is self cleaning as claimed in claim 5 wherein the process for air filtration further comprises:
   passing an airstream to be filtered through a self cleaning machine for air filtration comprising,
   a inline dryer assembly.

8. A process for air filtration that is self cleaning as claimed in claim 6 wherein the process for air filtration further comprises:
   passing an airstream to be filtered through a self cleaning machine for air filtration comprising,
   the option of dependent claim 6 or 7 to be placed within the process where needed to achieve maximum efficiency.

9. A process for air filtration comprising the steps of passing an airstream to be filtered through a self cleaning air filtration machine comprising:
   a filter comprising a motor driven belt or disk or counter rotating disks that are perforated;
   a spray bar;
   a recirculation pump and supply line;
   a wet tank;
   a ultra sonic transducer;
   ultra violet submersible bulbs;
   a water fill port;
   a liquid level sensor;
   a liquid and sediment drain port; and
   a power source.

10. A process for air filtration comprising the steps of passing an airstream to be filtered through a self cleaning air filtration machine as claimed in claim 1 further comprising a subsonic transducer on said wet tank.

11. A process for air filtration comprising the steps of passing an airstream to be filtered through a self cleaning air filtration machine as claimed in claim 1 further comprising a treated surface on said belt, disk or disks.

12. A process for air filtration comprising the steps of passing an airstream to be filtered through a self cleaning air filtration machine as claimed in claim 1 further comprising a chemical injection port on said wet tank.

* * * * *